Jan. 28, 1969    C. P. BEAN    3,424,953
ELECTROKINETIC TRANSDUCER WITH ION SCAVENGING
Filed Feb. 2, 1966
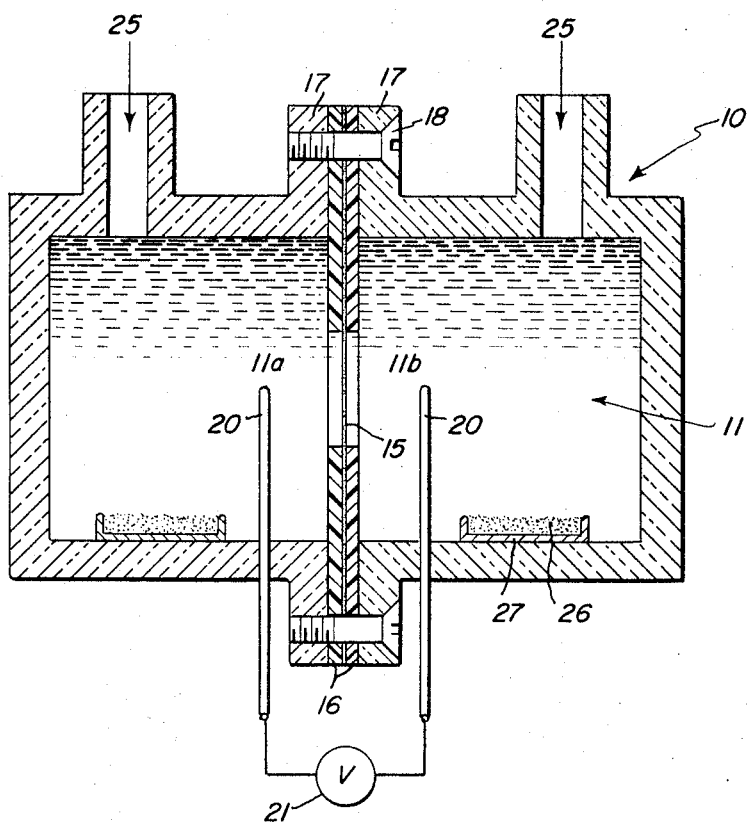
Inventor:
Charles P. Bean,
by Richard A. Speer
His Attorney.

United States Patent Office 3,424,953
Patented Jan. 28, 1969

1

3,424,953
ELECTROKINETIC TRANSDUCER WITH
ION SCAVENGING
Charles P. Bean, Schenectady, N.Y., assignor to General
Electric Company, a corporation of New York
Filed Feb. 2, 1966, Ser. No. 524,597
U.S. Cl. 317—231            2 Claims
Int. Cl. H01g 9/02

ABSTRACT OF THE DISCLOSURE

A transducer for converting a pressure difference between two bodies of a polar liquid into an electrical potential is provided which comprises a chamber divided into two sections by a porous membrane through which the liquid is forced. A sensing electrode is located in each section adjacent the membrane and is connected to an electrically responsive device such as a voltmeter, for example. The sections contain a bed of mixed ion exchange resins for removing undesired cations and anions from the liquid and replacing them with hydrogen and hydroxyl ions.

---

This invention relates to electrokinetic pressure transducers and more particularly to such transducers having improved stability and sensitivity.

Electrokinetic devices operate on the basis of a phenomenon called "streaming potential" that is exhibited when a polar liquid is forced through a porous plug or membrane. This movement causes an electric potential to be developed across the plug. The differences in potential existing on opposite sides of the membrane can be measured and utilized by placing electrodes on either side of the plug within the electrokinetic liquid. Electrokinetic transducers may be used in a variety of situations where a sensitive electrical output resulting from pressure changes could be readily utilized. For example, the devices may be used for measurement of pressure and differential pressures as in a microphone pickup, vibration pickup, strain gauge pickup, etc.

The principal drawback encountered with electrokinetic transducers is the decrease in sensitivity that occurs in the device due to contamination of the electrokinetic liquid with the passage of time. The contamination normally results from contact between the liquid and the walls of the device and contact of the liquid with air or other gaseous media. The factors that affect sensitivity may be seen from the basic equation for the streaming potential.

$$\Delta V_{sp} = (\epsilon \psi_z / 4\pi \eta \sigma_{sol} \, 9 \times 10'') \Delta P$$

where $\Delta V_{sp}$ = streaming potential across membrane (volts).
$\epsilon$ = dielectric constant of solution (cgs.).
$\psi_z$ = surface potential of membrane pore (volts).
$\eta$ = viscosity of solution (poise).
$\sigma_{sol}$ = conductivity of solution ($\Omega^{-1}$ cm.$^{-1}$).
$\Delta P$ = pressure drop across membrane (dynes/cm.$^2$).

To make a sensitive cell with a given liquid, large surface potential and low conductivity in the liquid is required. Low conductivity implies a pure solution; hence, the strong deleterious effect of progressive contamination from cell walls or atmosphere (mainly $CO_2$).

It is a principal object of this invention to provide an electrokinetic transducer having improved sensitivity.

It is an additional object of this invention to provide an electrokinetic transducer in which the electrokinetic liquid is stabilized against contamination which would result in degradation of its properties.

It is a further object of this invention to provide a process for improving the sensitivity of electrokinetic transducers.

2

Other objects and advantages of this invention will be in part obvious and in part explained by reference to the accompanying specification and drawings.

In the drawings:

The figure shows a cross-sectional view through an electrokinetic transducer having improved sensitivity according to this invention.

Broadly, the device of this invention comprises means defining a chamber for containing an electrokinetic liquid, this chamber being divided or separated into two sections by a porous membrane, thereby making possible the creation of electric potential by applying pressure to the liquid on one side of the dividing membrane. Sensing electrodes are located within the liquid on each side of the porous membrane and these electrodes may be connected to electrically responsive devices of various types. The electrokinetic liquid is a polar liquid and contains a bed of mixed ion exchange resins within it to remove contaminating ions from the liquid and thereby improve and stabilize the sensitivity of the electrokinetic transducer device.

The invention can be better understood by referring to the drawings wherein the numeral 10 indicates means, such as vessel 10, defining a chamber 11 capable of holding an electrokinetic liquid. The chamber 11 is divided into two sections 11a and 11b by means of porous membrane 15 which is mounted between electrically non-conductive members 16. The membrane 15 and members 16 are clamped tightly together between the flanges 17, these flanges being held tightly together by means of screws 18. This particular construction is given only by way of example since it is obvious that virtually any type of physical construction can be used to provide a porous plug or membrane between opposed liquid-containing chambers.

A pair of electrodes 20 extend through the wall of vessel 10 on opposite sides of diaphragm 15 to sense the potential differential existing within the device when pressure is exerted against the electrokinetic liquid. The electrodes 20 are shown as connected to a voltmeter 21 but obviously the connection can be made to other types of electrically responsive devices depending upon the intended use. A pressure transmitting opening 25 is provided on each side of vessel 10 so that gas pressure can be exerted against the opposed surface of the liquid and thereby create a pressure differential between sections 11a and 11b. Pressure can be created against the liquid on either side of the membrane and still give rise to a differential electric potential.

As was indicated earlier, the principal problem arising in conjunction with electrokinetic transducer devices is gradual contamination of the fluid contained within the system. In most situations, the contamination will be due largely to contact with air, $CO_2$, constituting the major contaminant. As the liquid within the device becomes increasingly contaminated, as with $CO_2$, the sensitivity or voltage output of the device decreases rapidly. For example, electrokinetic transducers filled initially with distilled water become essentially inoperable or at least of severely restricted ability within a few days (3 to 7).

To overcome these difficulties, it has now been found that significantly improved transducer sensitivity and stability can be obtained by placing a quantity of mixed ion exchange resins within the electrokinetic liquid in the two sections on each side of membrane 15. In the figure, this material is indicated by the numeral 26 and is shown as being contained within a small tray or receptacle 27. Mixed resins are used so that the fluid is cleansed both of cations and of anions. The resin extracts the cations and anions from the liquid and replaces them with hydrogen ions and hydroxyl ions, respectively. In tests conducted utilizing a device of the general type shown in the drawings, it was found that the sensitivity or stability of the transducer was essentially constant for several weeks.

Any type of polar liquid can be used as the electrokinetic liquid, insulating liquids obviously being unacceptable, since conduction to the electrodes is required for operation of the device. Liquids such as water, acetonitrile, acid solutions, and dimethyl sulfoxide are all suitable for application in these systems. The porous membrane can be constructed of any insulating material having the proper pore diameter. In connection with pore diameter, the electrokinetic effect can be produced with large pore sizes but the mass transfer of liquid from one side of the diaphragm to the other makes overly large pore sizes of limited value. Therefore, the pores in the membrane should generally be not more than about one micron in diameter.

From the preceding, it is apparent that the performance of electrokinetic transducers can be significantly improved by the process of filling the pressure chamber with a polar liquid substantially free of ion content and then maintaining the liquid substantially free of ion content during operation of the transducer. On the other hand, if a liquid is added which has any ion content, this can be reduced so that the liquid is then substantially ion-free and then maintaining the liquid free of ions during subsequent operations.

Although the present invention has been described in connection with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What I claim as new and desire to secure by Letters Patent of the United States is:

1. An electrokinetic transducer having improved sensitivity comprising,
   means defining a chamber for containing an electrokinetic liquid,
   an electrically non-conductive porous membrane separating the liquid-containing chamber into two sections,
   an electrode operatively disposed within each of said chamber sections to detect electric potential across said non-conductive porous membrane, and
   a polar electrokinetic liquid filling said chamber sections, said sections each containing mixed ion exchange resins are removing cations and anions from said liquid and replacing them with hydrogen and hydroxyl ions respectively.

2. A transducer as defined in claim 1 wherein the holes in said porous membrane do not exceed about one micron in diameter.

References Cited

UNITED STATES PATENTS

| | | | |
|---|---|---|---|
| 2,644,900 | 7/1953 | Hardway | 317—230 |
| 2,644,901 | 7/1953 | Hardway | 317—230 |
| 2,644,902 | 7/1953 | Hardway | 317—230 |
| 2,782,394 | 2/1957 | Hardway | 317—231X |
| 3,143,691 | 8/1964 | Hurd | 317—231 |
| 3,304,446 | 2/1967 | Martinek et al. | 310—8 |

OTHER REFERENCES

Encyclopedia of Chemical Technology, pp. 753–763 of 2nd supplement, 1960, by Kirk & Othmer.

JAMES D. KALLAM, *Primary Examiner.*

U.S. Cl. X.R.

310—8